United States Patent
Gerardo Castro et al.

(10) Patent No.: US 12,449,532 B2
(45) Date of Patent: Oct. 21, 2025

(54) OBJECT DETECTION USING REFLECTIVE SURFACES

(71) Applicant: Ford Global Technologies, LLC, Dearborn, MI (US)

(72) Inventors: Marcos Paul Gerardo Castro, San Francisco, CA (US); Aniruddh Ravindran, Mountain View, CA (US); Mishel Johns, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 484 days.

(21) Appl. No.: 17/932,313

(22) Filed: Sep. 15, 2022

(65) Prior Publication Data

US 2024/0094384 A1 Mar. 21, 2024

(51) Int. Cl.
*G01S 13/89* (2006.01)
*B60W 30/09* (2012.01)
(Continued)

(52) U.S. Cl.
CPC ................ *G01S 13/89* (2013.01); *G01S 7/40* (2013.01); *G01S 7/4808* (2013.01); *G01S 7/497* (2013.01); *G01S 13/867* (2013.01); *G01S 13/931* (2013.01); *G01S 17/86* (2020.01); *G01S 17/89* (2013.01); *G01S 17/931* (2020.01); *G06T 7/70* (2017.01); *B60W 30/09* (2013.01); *B60W 30/0956* (2013.01); *B60W 60/0015* (2020.02); *B60W 60/0027* (2020.02); *B60W 2420/403* (2013.01); *G06T 2207/20076* (2013.01); *G06T 2207/20084* (2013.01); *G06T 2207/30241* (2013.01); *G06T 2207/30261* (2013.01)

(58) Field of Classification Search
CPC ........ G01S 13/89; G01S 17/931; G01S 17/86; G01S 7/40; G01S 13/867; G06T 7/70; B60W 60/0015; B60W 60/0027; B60W 30/09

See application file for complete search history.

(56) References Cited

U.S. PATENT DOCUMENTS

| 11,057,497 B2 | 7/2021 | Shimizu et al. |
| 2019/0391270 A1* | 12/2019 | Uehara ................... G01S 17/04 |

(Continued)

FOREIGN PATENT DOCUMENTS

| EP | 1475764 B1 * | 6/2007 | ............. G01S 17/89 |
| EP | 3569977 A1 * | 11/2019 | ............. G01C 11/02 |

(Continued)

*Primary Examiner* — Lisa M Caputo
*Assistant Examiner* — Nyla Gavia
(74) *Attorney, Agent, or Firm* — Frank A. MacKenzie; Brooks Kushman P.C.

(57) ABSTRACT

Tracking an object included in a reflective surface by detecting the reflective surface included in one or more images included in a plurality of images by determining a location of the reflective surface in pixel coordinates and tracking the location of the reflective surface in the plurality of images. Real world locations of the object can be determined based on attributes of the reflective surface including a geometric class, extrinsic properties that relate the reflective surface to an environment, intrinsic properties describing the reflective surface without referring to the environment and calibration properties of the sensor.

20 Claims, 7 Drawing Sheets

(51) Int. Cl.
  *B60W 30/095* (2012.01)
  *B60W 60/00* (2020.01)
  *G01S 7/40* (2006.01)
  *G01S 7/48* (2006.01)
  *G01S 7/497* (2006.01)
  *G01S 13/86* (2006.01)
  *G01S 13/931* (2020.01)
  *G01S 17/86* (2020.01)
  *G01S 17/89* (2020.01)
  *G01S 17/931* (2020.01)
  *G06T 7/70* (2017.01)

(56) References Cited

U.S. PATENT DOCUMENTS

2021/0309248 A1  10/2021  Choe et al.
2021/0370931 A1  12/2021  Sannomiya et al.
2023/0401745 A1* 12/2023  Kothari .................... G06T 7/70

FOREIGN PATENT DOCUMENTS

WO      2021245515 A1    12/2021
WO   WO-2022226989 A1 *  11/2022  ............... G06T 7/11

* cited by examiner

OBJECT DETECTION USING REFLECTIVE SURFACES

BACKGROUND

Images can be acquired by sensors and processed using a computer to determine data regarding objects in an environment around a system. Operation of a sensing system can include acquiring accurate and timely data regarding objects in the system's environment. A computer can acquire images from one or more image sensors that can be processed to determine data regarding objects. Data extracted from images of objects can be used by a computer to operate systems including vehicles, robots, security systems, and/or object tracking systems.

DETAILED DESCRIPTION

Figure 1:
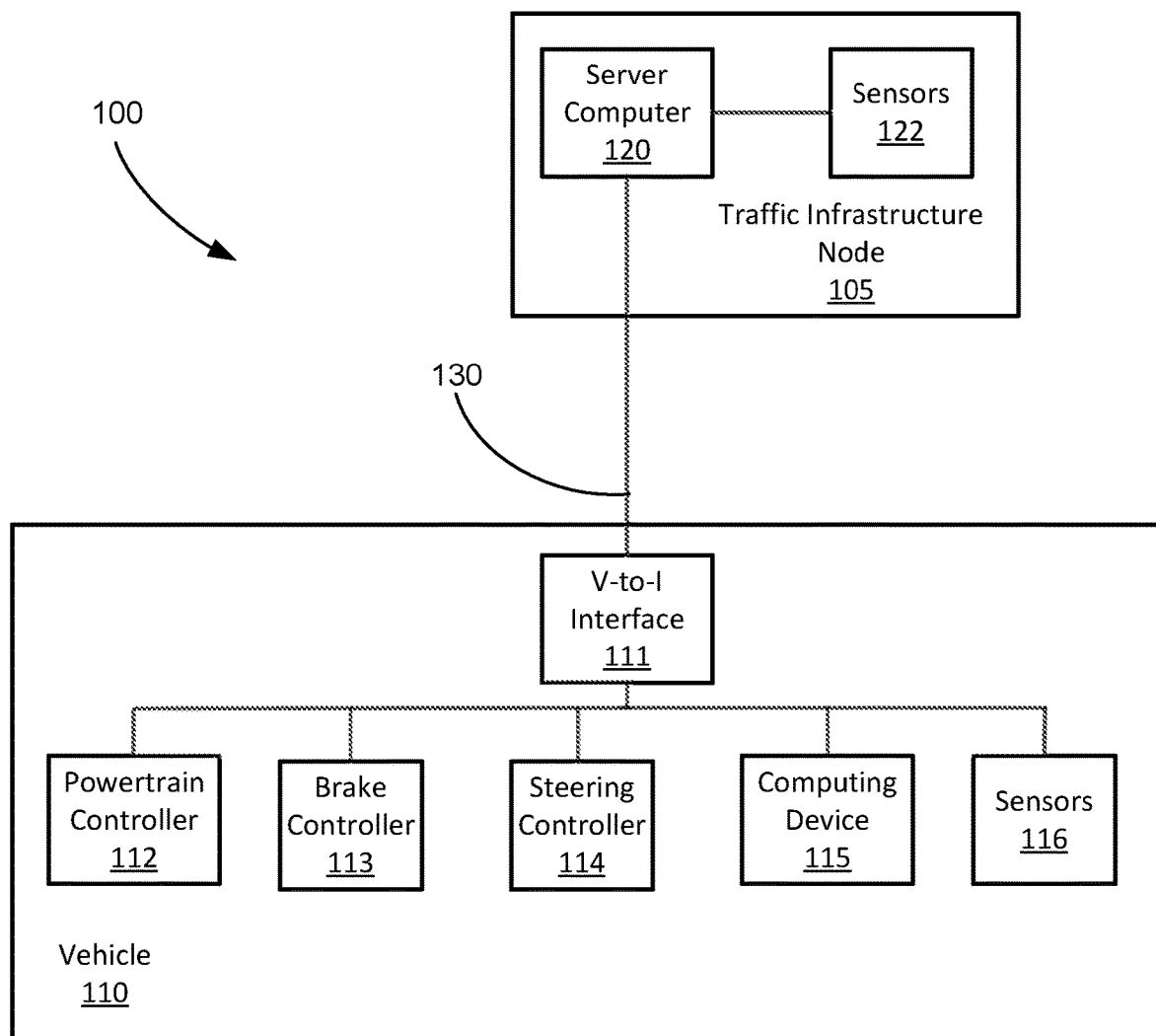
FIG. 1 is a block diagram of an example traffic infrastructure system.

As described herein, a vehicle system can locate objects in traffic and determine a vehicle path that avoids contact with the objects. The system can assist in tracking objects in a traffic scene, including determining an object trajectory. A trajectory is a set of location values that includes velocities, e.g., speeds and headings. A computer in a vehicle can determine a vehicle trajectory for operating the vehicle that avoids contact with an object based on the object trajectory. A vehicle system is described herein as an example; however, techniques for locating objects, determining trajectories, and predicting probabilities of contact can be applied to other systems including arial, underwater and surface drones. Trajectories for moveable portions of stationary robots can also be determined and compared to trajectories of objects in an environment around the robot to avoid contact between the object and moveable portions of the robot.

Techniques described herein enhance determination of real world locations of objects by determining real world 3D locations of objects included in reflective surfaces viewed by sensors included in a system such as a vehicle. Sensors can include video, lidar or radar sensors, for example, and reflective surfaces can include mirrors, windows, puddles, or metallic surfaces such as vehicle body panels. By determining trajectories for objects viewed in reflective surfaces, probabilities of contact between vehicles and object can be predicted for objects that are outside the normal field of view of sensors included in the vehicle. By determining probabilities of contact for objects outside the normal field of view of vehicle sensors, the vehicle can have more time to make corrections to the vehicle's trajectory to avoid possible contact.

The real world location of an object included in a reflective surface can be determined based on attributes of the reflective surface including a geometric class which are extrinsic properties of the reflective surface that relate the reflective surface to an environment, intrinsic properties that describe the reflective surface without referring to the environment and calibration properties of the sensor. A trajectory for the object can be determined based on determining a plurality of real world locations for the object and determining a predicted trajectory that includes predicted locations, speeds and directions for the object. A predicted trajectory can be determined for the vehicle based on data from sensors included in the vehicle and the object trajectory compared to the vehicle trajectory to determine a probability of contact.

A method is disclosed herein, including acquiring a plurality of images from a sensor and detecting a reflective surface included in the images by determining a location of the reflective surface in pixel coordinates. A plurality of real world object locations of an object included in the reflective surface can be determined based on attributes of the reflective surface including a geometric class, extrinsic properties that relate the reflective surface to an environment, intrinsic properties describing the reflective surface without referring to the environment and calibration properties of the sensor. An object trajectory can be determined based on tracking the plurality of real world locations of the object. A probability of contact between the object and the sensor can be determined based on the plurality of real world locations, the object trajectory, a location of the sensor and a trajectory for the sensor. The probability of contact between the object and the sensor can include a probability based on a closest approach between the object and the sensor. The probability of contact between the sensor and the object can be determined by the trajectory for the sensor based on the real world location, speed, and direction of the sensor, and determining the trajectory for the object based on the real world location, speed, and direction of the object.

The sensor can be included in a vehicle and the probability of contact between the object and the sensor includes a probability of contact between the object and the vehicle. The vehicle can be operated based on the probability of contact between the object and the vehicle. The geometric class can include one or more of planar, convex, concave, and irregular, the extrinsic properties include location, size and orientation of the reflective surface, and the intrinsic properties include an optical distortion model. The calibration properties of the sensor can include a sensor location, a sensor orientation, a sensor focal distance, and a sensor scale. The reflective surface can be one or more of a mirror, a surface of a puddle, a window, and a metallic surface. A plurality of locations of the reflective surface can be detected and the geometric class, the extrinsic properties, and the intrinsic properties of the reflective surface are determined by inputting the plurality of images into a neural network. The real world locations of the reflective surface can be determined based on output from the neural network and the calibration properties of the sensor. The real world locations of the reflective surface can be tracked by inputting the real world locations of the reflective surface into a Kalman filter. A region of interest can be determined included in the reflective surface included in the plurality images that include the object.

Further disclosed is a computer readable medium, storing program instructions for executing some or all of the above method steps. Further disclosed is a computer programmed for executing some or all of the above method steps, including a computer apparatus, programmed to acquire a plurality of images from a sensor and detect a reflective surface included in the images by determining a location of the reflective surface in pixel coordinates. A plurality of real world object locations of an object included in the reflective surface can be determined based on attributes of the reflective surface including a geometric class, extrinsic properties that relate the reflective surface to an environment, intrinsic properties describing the reflective surface without referring to the environment and calibration properties of the sensor. An object trajectory can be determined based on tracking the plurality of real world locations of the object. A probability of contact between the object and the sensor can be determined based on the plurality of real world locations, the object trajectory, a location of the sensor and a trajectory for the sensor. The probability of contact between the object and the sensor can include a probability based on a closest approach between the object and the sensor. The probability of contact between the sensor and the object can be determined by the trajectory for the sensor based on the real world location, speed, and direction of the sensor, and determining the trajectory for the object based on the real world location, speed, and direction of the object.

The instructions can include further instructions to include a sensor in a vehicle wherein the probability of contact between the object and the sensor includes a probability of contact between the object and the vehicle. The vehicle can be operated based on the probability of contact between the object and the vehicle. The geometric class can include one or more of planar, convex, concave, and irregular, the extrinsic properties include location, size and orientation of the reflective surface, and the intrinsic properties include an optical distortion model. The calibration properties of the sensor can include a sensor location, a sensor orientation, a sensor focal distance, and a sensor scale. The reflective surface can be one or more of a mirror, a surface of a puddle, a window, and a metallic surface. A plurality of locations of the reflective surface can be detected and the geometric class, the extrinsic properties, and the intrinsic properties of the reflective surface are determined by inputting the plurality of images into a neural network. The real world locations of the reflective surface can be determined based on output from the neural network and the calibration properties of the sensor. The real world locations of the reflective surface can be tracked by inputting the real world locations of the reflective surface into a Kalman filter. A region of interest can be determined included in the reflective surface included in the plurality images that include the object.

FIG. 1 is a block diagram of a traffic infrastructure system 100 that can include a traffic infrastructure node 105 that includes a server computer 120 and stationary sensors 122. The system 100 includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (i.e., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, i.e., via a vehicle communications bus as described further below, more than one computing devices, i.e., controllers or the like included in the vehicle 110 for monitoring and/or controlling various vehicle components, i.e., a powertrain controller 112, a brake controller 113, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in the vehicle and/or receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2X) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2X) interface 111 to a server computer 120 or user mobile device 160.

As already mentioned, generally included in instructions stored in the memory and executable by the processor of the computing device 115 is programming for operating one or more vehicle 110 components, i.e., braking, steering, propulsion, etc., without intervention of a human operator. Using data received in the computing device 115, i.e., the sensor data from the sensors 116, the server computer 120, etc., the computing device 115 may make various determinations and/or control various vehicle 110 components and/ or operations without a driver to operate the vehicle 110. For example, the computing device 115 may include programming to regulate vehicle 110 operational behaviors, i.e., physical manifestations of vehicle 110 operation such as speed, acceleration, deceleration, steering, etc., as well as tactical behaviors, i.e., control of operational behaviors typically in a manner intended to achieve efficient traversal of a route such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110. The computing device 115 may be or include a controller, and may be embodied as an ECU.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, i.e., a passenger car, light truck, etc. The vehicle 110 includes one or more sensors 116, the V2X interface 111, the computing device 115 and one or more controllers 112, 113, 114. The sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in autonomous, semi-autonomous, or manual modes. By a semi- or fully-autonomous mode, we mean a mode of operation wherein a vehicle can be piloted partly or entirely by a computing device as part of a system having sensors and controllers. For purposes of this disclosure, an autonomous mode is defined as one in which each of vehicle propulsion (i.e., via a powertrain including an internal combustion engine and/or electric motor), braking, and steering are controlled by one or more vehicle computers; in a semi autonomous mode the vehicle computer(s) control(s) one or more of vehicle propulsion, braking, and steering. In a non-autonomous mode, none of these are controlled by a computer. In a semi autonomous mode, some but not all of them are controlled by a computer.

A traffic infrastructure node 105 can include a physical structure such as a tower or other support structure (i.e., a pole, a box mountable to a bridge support, cell phone tower, road sign support, etc.) on which infrastructure sensors 122, as well as server computer 120, can be mounted, stored, and/or contained, and powered, etc. One traffic infrastructure node 105 is shown in FIG. 1 for ease of illustration, but the system 100 could and likely would include tens, hundreds, or thousands of traffic infrastructure nodes 105. The traffic infrastructure node 105 is typically stationary, i.e., fixed to and not able to move from a specific geographic location. The infrastructure sensors 122 may include one or more sensors such as described above for the vehicle 110 sensors 116, i.e., lidar, radar, cameras, ultrasonic sensors, etc. The infrastructure sensors 122 are fixed or stationary. That is, each sensor 122 is mounted to the infrastructure node so as to have a substantially unmoving and unchanging field of view.

Server computer 120 typically has features in common with the vehicle 110 V2X interface 111 and computing device 115, and therefore will not be described further to avoid redundancy. Although not shown for ease of illustration, the traffic infrastructure node 105 also includes a power source such as a battery, solar power cells, and/or a connection to a power grid. A traffic infrastructure node 105 server computer 120 and/or vehicle 110 computing device 115 can receive sensor 116, 122 data to monitor one or more objects. An "object," in the context of this disclosure, is a physical, i.e., material, structure or thing that can be detected by a vehicle sensor 116 and/or infrastructure sensor 122.

Figure 2:
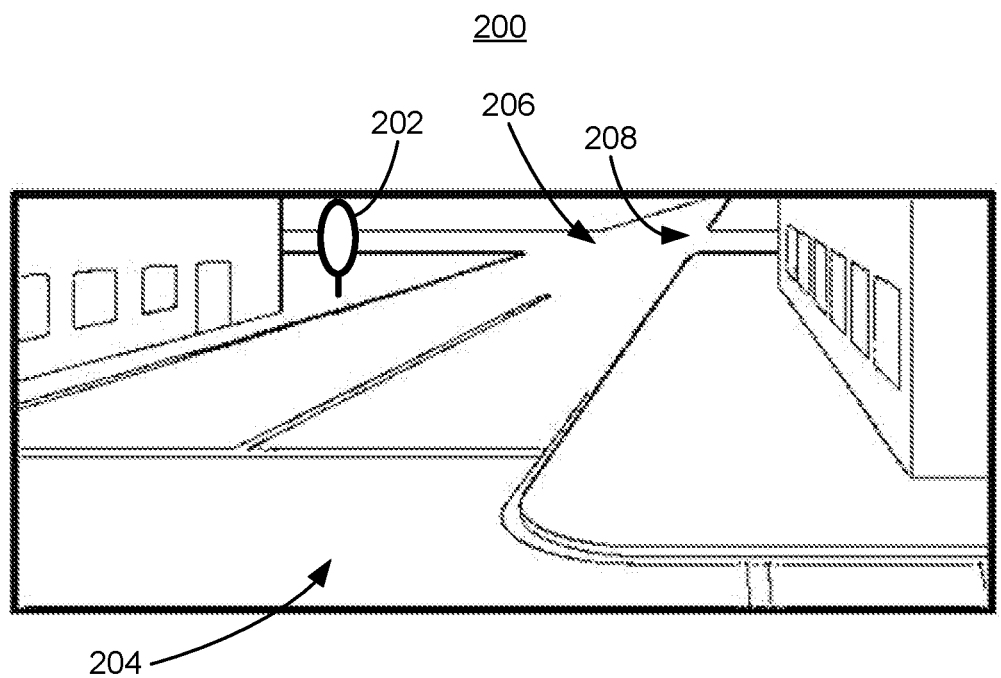
FIG. 2 is a diagram of an example image of a traffic scene.

FIG. 2 is a diagram of an image 200 of a traffic scene. Image 200 can be acquired by a sensor 116 included in a vehicle 110 as it operates on a roadway 204. As discussed above in relation to FIG. 1, a vehicle 110 can include a variety of sensors including video cameras, lidar, radar, ultrasound, etc., that acquire data regarding an environment around a vehicle 110. A computing device 115 in the vehicle 110 can receive as input data acquired by sensors 116 and process the data to determine locations of roadways 204 and objects on or near the roadway 204. A computing device 115 in a vehicle 110 can use software programs such as deep neural networks to track objects in the environment around the vehicle 110. In other examples, image 200 of a traffic scene can be acquired by a server computer 120 from sensors 122 included in a traffic infrastructure node 105. The image 200 can be communicated to a computing device 115 in a vehicle 110 for processing to determine locations of roadways 204 and objects on or near the roadway 204 or the image can be processed by server computer 120 and the results of processing communicated to a computing device 115 included in a vehicle 110

Tracking an object can include determining real world locations for an object in sensor data such as a plurality of images, for example, and determining a trajectory for the object. The computing device 115 can determine a proposed trajectory for the vehicle 110 and compare the proposed vehicle trajectory to the object trajectory to determine a probability of contact between the vehicle and the object. Based on the probability of contact, the computing device 115 can revise the proposed vehicle trajectory by changing proposed speed and direction for the vehicle 110 including stopping the vehicle 110. When the computing device 115 has determined a vehicle trajectory with a low enough probability of contact with an object, computing device 115 can control vehicle powertrain, vehicle steering, and vehicle brakes to operate vehicle on the determined vehicle trajectory. In most examples, probabilities of contact with an object are determined to be less than 1% before a computing device 115 will operate vehicle 110 in the vicinity of a tracked object.

In image 200, a vehicle 110 traveling on roadway 204 can be approaching an intersection 206. Typically, programs executing on a computing device 115 included in vehicle 110 only detect and track objects visible within the line of sight of sensors 116. The line of sight of a sensor are the straight lines that connect the sensor to points in the environment. This applies to video cameras, lidar, radar and ultrasound sensors 116. Because of this limitation, objects approaching the intersection 206 from a direction 208 outside of the line of sight of sensors 116 cannot be tracked.

Techniques discussed herein enhance object tracking by detecting a reflective surface 202 in images 200 of an environment around a vehicle 110 and tracking an object visible in the reflective surface 202. Images 200 are used as examples of sensor 116 data, however, lidar, radar and ultrasound data can also be reflected by appropriate surfaces in an environment around a vehicle. Techniques discussed herein for detecting and tracking objects in video images 200 can also be applied to lidar, radar, and ultrasound data. An object trajectory in real world coordinates can be determined by detecting and tracking objects in a reflective surface 202. Reflective surfaces 202 can include mirrors installed to alert a vehicle 110 of possible objects around corners or other traffic situations where objects can be approaching a vehicle 110 outside of normal lines of sight.

Reflective surfaces 202 reflect light rays that impinge on the surface with specular reflection. Specular reflection is an optical property of surfaces where light rays impinging on the surface are reflected in a mirror-like fashion. In specular reflection, the outgoing angle of reflection is the same as the incoming angle of incidence measured with respect to a surface normal vector. Mirrors are used herein as examples of reflective surfaces 202, however, reflective surfaces 202 can also include windows, puddles, or other reflective surfaces on vehicles or buildings, etc. Any surface that includes a contiguous region reflects light rays by specular reflection can be used to detect and track objects as described herein. Windows, puddles, and smooth reflective surfaces such as vehicle panels or building panels can reflect images that can be used to detect and track objects.

An example of a puddle being used to track an object can be a puddle underneath a truck trailer reflecting an image of a pedestrian walking behind the trailer. A computing device 115 acquiring data from a sensor 116 in a vehicle 110 can, using techniques described herein, detect and track the motion of the pedestrian and determine a trajectory that would predict that the pedestrian would exit from behind the trailer and possibly intersect a planned trajectory for the vehicle 110. In similar fashion, a reflection of a pedestrian in a store window along a roadway could be used to determine a trajectory for the pedestrian when the pedestrian was not directly visible to a vehicle 110. Techniques for tracking object in reflective surfaces can enhance operation of vehicles by determining possible contact with objects before they are directly visible in the fields of view of sensors 116 included in a vehicle 110.

Figure 3:
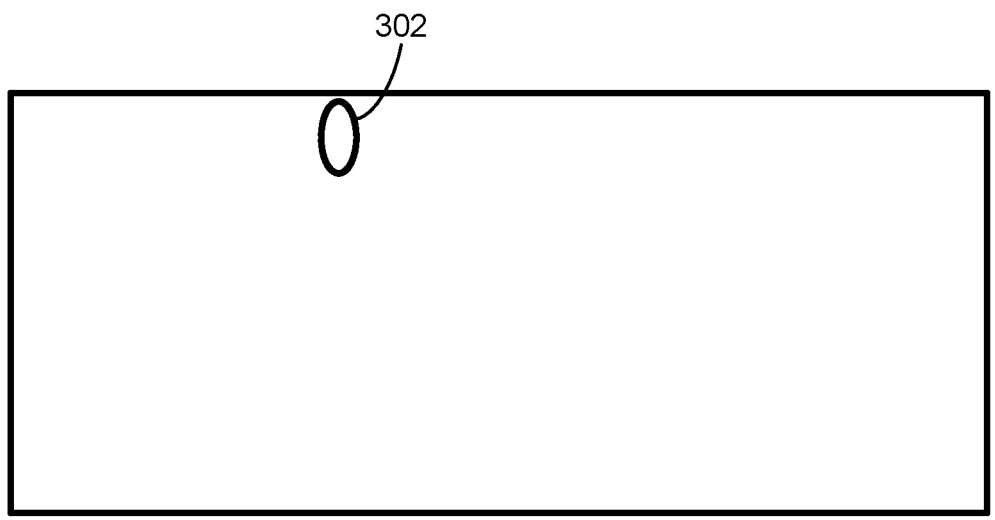
FIG. 3 is a diagram of an example reflective surface region of interest.

FIG. 3 is a diagram of an image 300 of a traffic scene where a region of interest 302 that includes reflective surface 202 from FIG. 2 has been determined by image processing software executing on a computing device 115 in a vehicle 110. The computing device 115 can set the pixel values outside of region of interest 302 to zero to reduce computing requirements and avoid confusion with non-reflected image data. A deep neural network can be trained to determine a region of interest 302 that includes a reflective surface 202 in an image 200 based on determining contrast between a local region and its surroundings. Edges of mirrors will exhibit a high degree of local contrast determined by convolving the pixels of the image with 3×3 neighborhoods of pixels to determine local contrast and comparing the local contrast with more general non-local contrasts determined based on surrounding regions of the image at a plurality of resolutions. A description of a technique for locating reflective surfaces in an image based on local contrast can be found in "Where Is My Mirror", Xin Yang, et. al., ICCV, 2019.

A neural network can be trained to detect reflective surfaces and to distinguish between different types of reflective surfaces. Different types of reflective surfaces include mirrors, puddles, windows, and reflective metallic surfaces including portions of vehicles, for example. Reflective surfaces can be detected by inputting the image data to a neural network as discussed above and constructing a region of interest to include the detected reflective surface. The real world location of the reflective surface can be determined based on the locations output from the neural network and the extrinsic and intrinsic properties of the sensor that acquired the image data. For example, extrinsic properties of a sensor can include the x, y, and z location of the sensor with respect to a ground plane such as a roadway and the roll, pitch, and yaw orientation of the sensor with respect to the x, y, and z coordinates. Using projective geometry, extrinsic properties and intrinsic properties of the sensor such as focal length and scale, real world locations of reflective surfaces can be determined based on pixel locations in an image.

A reflective surface can be detected in a plurality of images acquired at a series of time steps and the location of the regions of interests indicated by the detected reflective surfaces can be tracked by inputting the locations output from the neural network to a Kalman filter. Kalman filters can provide a more accurate estimation of the locations of time series events by fitting the locations to a curve that filters out noise in the measurements of the locations. In this fashion errors introduced into the locations of reflective surfaces by errors in applying extrinsic and intrinsic properties of the sensor to pixel locations that introduce errors in real world locations can be filtered out by Kalman filtering.

Once the locations of the regions of interest indicated by the reflective surfaces are determined, the extrinsic and intrinsic properties of the reflective surfaces can be determined. The extrinsic properties of a reflective surface describe one or more relationships of the reflective surface to an environment and/or other objects, and can include a location, size, and orientation in three dimensions (3D) relative to the vehicle 110 acquiring the images. The location and orientation of the reflective surfaces in 3D can include distance from the vehicle 110, height above a roadway and orientation of the reflective surface with respect to the vehicle 110.

The 3D location and orientation of the reflective surface can be determined geometrically based on calibration properties of the sensor that acquired the data. Calibration properties include intrinsic and extrinsic properties of the sensor. Intrinsic properties of an image sensor can include focal distance, e.g., the distance between the center of focus of the optics or lens from the image sensor plane and the scale or size of the image sensor. Extrinsic properties include the height of the image sensor above a supporting plane such as a roadway and the orientation of the sensor, e.g., the roll, pitch and yaw of the image sensor with respect to the vehicle 110. Roll, pitch and yaw are rotations measured about x, y, and z coordinate axes determined with respect to vehicle coordinates or global coordinates such as latitude, longitude and altitude.

Alternatively, neural networks to estimate the depth can also be used, such as MonoFlex or Kinematic 3D. Monoflex is a deep neural network for detecting 3D objects in monocular video image and can be found at github.com/zhangyp15/MonoFlex as of the filing date of this application. Kinematic 3D is described in "Kinematic 3D Object Detection in Monoclular Video", Brazil, G., Pons-Moll, G., Liu, X., Schiele, B., ECCV 2020, Lecture Notes in Computer Science, Vol 12368, Springer, 2020. These neural networks can determine distance, height and orientation for reflective surfaces in regions of interest in a series of images.

Intrinsic properties of the reflective surfaces include determining the geometric class, i.e., geometric description or classification, of the reflective surface. Geometric classes of reflective surfaces can include planar, concave, convex or irregular. The irregular geometric class includes reflective surfaces that can have surface geometries that are more complex than planar, concave, or convex, such as vehicle windows or vehicle body panels. Reflective surface geometric class can be determined by trained neural networks described above in relation to reflective surface extrinsic properties. Once the geometric class of the reflective surface is determined, optical distortion parameters of the reflective surface can be determined.

An optical distortion model includes parameters that describe the orientation of points on the surface of the reflective surface. The orientation of the surface of the reflective surface determines how light rays will be reflected from the surface. For example, a reflective surface can be divided into a plurality of contiguous regions and the orientation of the regions with respect to a canonical view of the reflective surface, for example looking straight down from a line perpendicular to and centered on the reflective surface. Combining the extrinsic properties of a reflective surface along with the extrinsic properties of the reflective surface permits a computer program, such as is known, to project rays from a sensor to the reflective surface, reflect off the reflective surface and trace the rays into space. Optical distortion parameters can be determined based on look up tables determined for the geometric classes of reflective surfaces. The look up tables can be determined by setting up computer aided design (CAD) files based on the geometric classes of reflective surfaces and analyzing the CAD files to determine surface orientations at a plurality of points indicated by centers of contiguous regions on the surface of the reflective surface. The density of points sampled can determine the resolution with which the reflective surface is modeled.

Ray tracing based on the optical distortion parameters of reflective surfaces can be combined with object detection applied to a region of interest that includes the reflective surface to determine the location of objects visible in the reflective surface. A neural network can be trained to detect objects in a region of interest indicated by a reflective surface. A location of an object detected in a reflective surface can be determined in real world coordinates based on the reflective surface geometric class, extrinsic parameters of the reflective surface, intrinsic parameters of the reflective surface and vehicle dynamics. The location of the object is initially determined in pixel coordinates relative to a region of interest. Because the pixel coordinates of the region of interest are determined with respect to the full image, and because the extrinsic parameters of the reflective surface, e.g., distance, location, and orientation with respect to the vehicle sensor have been determined, intrinsic parameters of the reflective surface permit ray tracing to be performed from the vehicle sensor to points in space that would otherwise not be visible to the vehicle sensors. Because optical ray tracing is deterministic based on the optical distortion properties of the reflective surface, and assuming that objects detected in the reflective surface are on the same ground plane or roadway as the vehicle, locations and distances to objects can be determined by simple projective geometry.

Because the motion of a vehicle 110 can be determined by sensors 116 included in the vehicle 110 and communicated to a computing device 115 included in the vehicle 110, motion of the object can be tracked with respect to the vehicle 110. Software programs such as TrackFormer ("TrackFormer: Multi-Object Tracking with Transformers", Meinardt, T., Kirillov, A, Leal-Taixe, L., and Feichtenhofer, C., arxiv.org/abs/2101.02702, Jan. 7, 2021) or CenterTrack ("Tracking Objects as Points", Zhou, X., Koltun, V., Krahenbuhl, P., arxiv.org/abs/2004.01177, Apr. 2, 2020) can be used to track the motion of an object with respect to a vehicle based on determining object locations.

Figure 4:
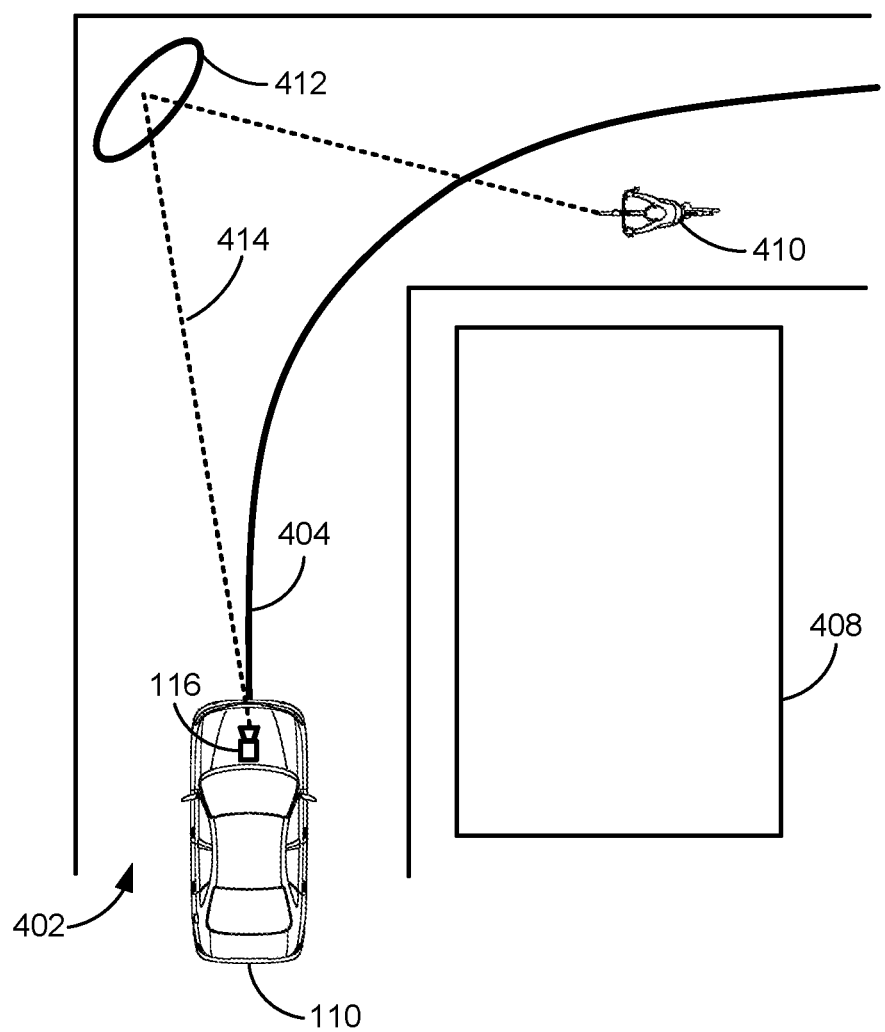
FIG. 4 is a diagram of an example traffic scene.

FIG. 4 is a diagram of a traffic scene 400 that illustrates a technique for tracking an object 410 from a vehicle 110. Vehicle 110 is traveling on a roadway 402 along a trajectory 404. A trajectory is a plurality of predicted locations for a vehicle 110 that include speed and orientation (heading). Included in traffic scene 400 is an object 410, in this example a bicycle with rider and a reflective surface 412. Because of an intervening object, in this example a building 408, object 410 is not directly visible to vehicle 110. Using techniques discussed above in relation to FIG. 3, a computing device 115 in vehicle 110 can acquire an image using sensor 116, in this example a video camera, that includes reflective surface 412. The image acquired by sensor 116 can be processed as described above to determine extrinsic and intrinsic properties of the reflective surface, 412 a region of interest that includes the reflective surface 412, and an image of object 410 included in the region of interest. The image of object 410 can be processed using the extrinsic and intrinsic properties of the reflective surface 412, the extrinsic and intrinsic properties of the sensor 116 and the location of the object 410 with respect to the image to determine a real world location of the object 410 despite not being directly visible to sensor 116.

Figure 5:
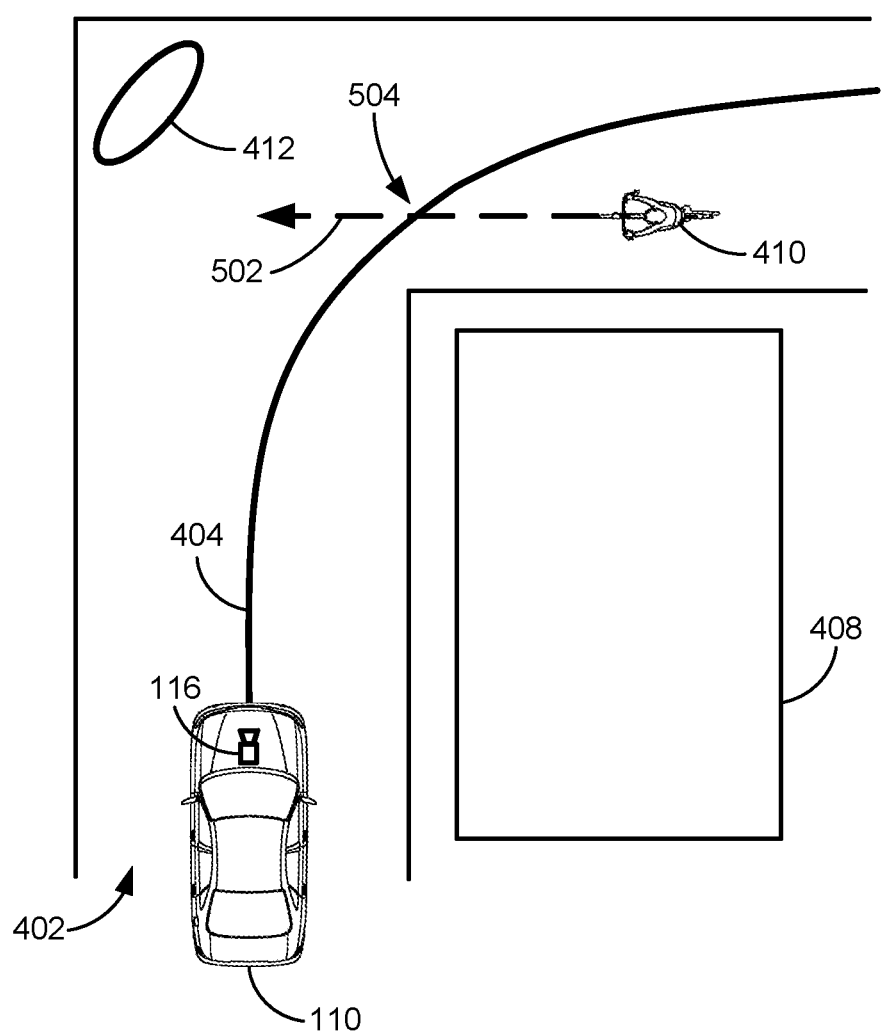
FIG. 5 is a diagram of an example traffic scene including an object trajectory.

FIG. 5 is a diagram of a traffic scene 500 where a computing device 115 included in vehicle 110 has acquired a plurality of images from a sensor 116, in this example a video camera. Computing device 115 has used techniques discussed in relation to FIGS. 2 and 3 to determine plurality of locations for object 410 and has tracked object 410 to determine a trajectory 502 for object 410 that includes locations, speed, and direction for object 410 as discussed above in relation to FIG. 3. Any suitable technique for determining a trajectory 502 based on a plurality of determined locations may be used. For example, a technique for determining a trajectory 502 based on a plurality of determined locations can include fitting a polynomial function to the determined locations. The polynomial function can be fit to the determined locations by a least squares technique, where the summed squares of the Euclidian distances between the determined locations and the polynomial function is minimized, for example. Assuming that the times at which the object locations are determined are recorded, the distances between successive locations are proportional to speed and tangents to the polynomial function are indicative of direction. By plotting vehicle trajectory 404 and object trajectory 502, computing device 115 can determine whether vehicle 110 and object 410 are predicted to occupy the same point 504 at a same time, meaning there is a possibility of contact between vehicle 110 and object 410.

Using the current location of the vehicle 110 determined using sensors 116 included in the vehicle 110 such as GPS and IMU, a predicted trajectory for the vehicle 110, a current location of the object 410 and a determined trajectory for the object 410 based on tracking the object 410 as discussed above, computing device 115 can determine a probability that vehicle 110 and object 410 will come into contact. For example, if the trajectories 404, 502 for the vehicle 110 and the object 410 indicate that they would occupy the same point 504 at the same time, the probability of contact would be 1. In examples where no object 410 is detected, the probability of contact would be 0. In examples where vehicle 110 and object 410 are predicted to pass each other without contact, the probability of contact can be set to a number between 0 and 1 based on the closest distance between vehicle 110 and object 410.

Probability distributions for errors included in measurements of locations for objects 410 and vehicles 110 can be determined empirically by performing experiments based on measuring a plurality of locations of objects 410 in reflective surfaces 412 and vehicles 110 as described herein. Probability distributions for errors can also be analytically estimated based on determining errors in the steps involved in the calculation. These errors include errors in intrinsic properties of the sensor and distortion parameters of the reflective surfaces 412, and errors in processing by computing device 115, etc. The determined locations of objects 410 and vehicle 110 can be compared to real world measured locations to determine probability distributions of errors. The probability distributions of errors in measurements can be applied to predicted distance at closest approach to predict the probability of contact.

Computing device 115 can use this data to determine a new trajectory 404 for vehicle 110 that avoids contact between vehicle 110 and object 410 based on the probability of contact. For example, probabilities greater than 0.9 can result in computing device 115 stopping vehicle 110, for example, to permit object 410 to pass by vehicle 110 without contact. Probabilities between 0.9 and 0.5 can result in computing device 115 slowing vehicle 110 on trajectory 404 to avoid coming closer than one vehicle length to object 410, for example. Probabilities less than 0.5 can result in no change to trajectory 404, because vehicle 110 is not predicted to pass closer than one vehicle length from object 410.

Figure 6:
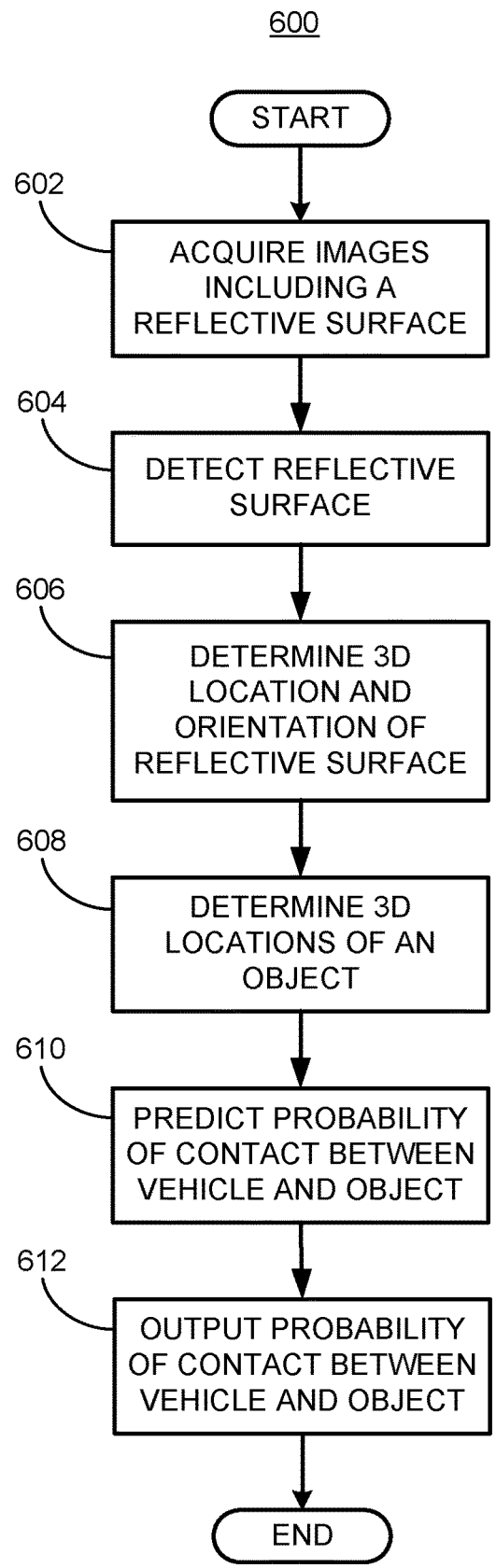
FIG. 6 is a flowchart diagram of an example process to determine object trajectories.

FIG. 6 is a flowchart, described in relation to FIGS. 1-5 of a process 600 for tracking an object 410 based on a reflective surface. Process 600 can be implemented by a processor of a computing device 115, taking as input images acquired from a sensor 116, executing commands, and outputting an object trajectory 502. In some examples of process 600, images could alternatively or additionally be acquired by sensors 122 included in a traffic infrastructure node 105 and communicated by a server computer 120 to a computing device 115. Process 600 includes multiple blocks that can be executed in the illustrated order. Process 600 could alternatively or additionally include fewer blocks or can include the blocks executed in different orders.

Process 600 begins at block 602, where a plurality of images are acquired by a sensor 116 included in a vehicle 110. The sensor 116 can be an image or video sensor, a lidar sensor, a radar sensor or an ultrasound sensor, for example.

At block 604 computing device 115 detects a reflective surface 412 in the image data acquired at block 602 using local contrast as discussed above in relation to FIG. 3, including determining pixel location(s) of the reflective surface in the image data. Process 600 can also determine the geometric class of the reflective surface 412, as discussed above in relation to FIG. 3, where the geometric class can include planar, convex, concave, or irregular. Region of interest and reflective surface geometric class passed to block 608.

At block 606 process 600 receives as input image data included in the region of interest and reflective surface geometric class determined at block 604 and determines the 3D location and orientation of reflective surface 412 with respect to vehicle 110 using the pixel location of the reflective surface 412 and calibration data that includes intrinsic and extrinsic data regarding the sensor 116 as discussed above in relation to FIG. 3. Pixels outside of the region of interest can be set to 0 to eliminate conflicting image data and reduce computational requirements. Process 600 determines optical distortion parameters from the input geometric class and 3D location and orientation of reflective surface 202 as discussed above in relation to FIG. 3.

At block 608 process 600 inputs the 3D location, size and orientation, optical distortion parameters, the region of interest, and the geometric class of the reflective surface 412 determined at blocks 604 and 606 and calibration data that includes intrinsic and extrinsic data regarding the sensor 116 as discussed above and determines real world 3D locations of an object 410. Process 600 can locate an object 410 in the image data included in the region of interest and locate the object 410 in real world coordinates based on the 3D location, size and orientation of the reflective surface 412, the optical distortion parameters of the reflective surface 412 and intrinsic and extrinsic properties of the sensor 116 as discussed above in relation to FIG. 3.

At block 610 process 600 receives as a plurality of real world locations of an object 410 determined at block 608 and vehicle dynamics of vehicle 110 determined by computing device 115 from vehicle sensors 116. Vehicle dynamics include a current real world location of vehicle 110 determined by vehicle sensors 116 including GPS and IMU data and a predicted trajectory 404 for vehicle 110. Process 600 predicts a trajectory 502 for object 410 and predicts a probability of contact between vehicle 110 and object 410 as discussed above in relation to FIG. 5.

At block 612 process 600 outputs the probability of contact to computing device 115. Following block 612 process 600 ends.

Figure 7:
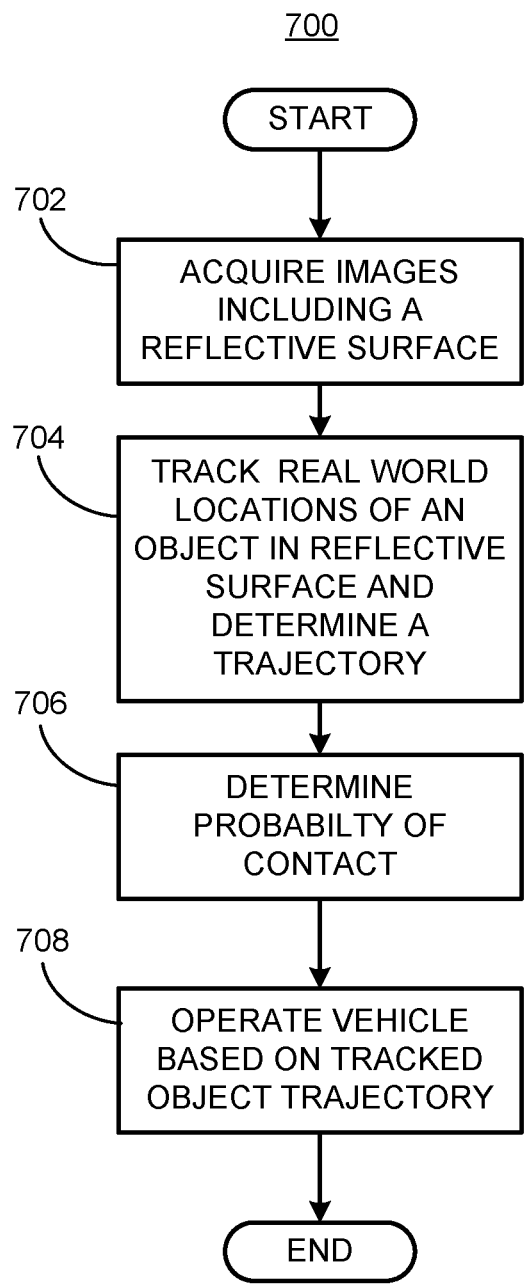
FIG. 7 is a flowchart diagram of an example process to operate a vehicle based on an object trajectory.

FIG. 7 is a flowchart, described in relation to FIGS. 1-6 of a process 700 for operating a vehicle 110 based on a probability of contact between a vehicle 110 and an object 410 based on data obtained from a reflective surface 412. Process 700 can be implemented by a processor of a computing device 115, taking as input image data that includes a reflective surface 412, executing commands, and operating a vehicle 110. Process 700 includes multiple blocks that can be executed in the illustrated order. Process 700 could alternatively or additionally include fewer blocks or can include the blocks executed in different orders.

At block 702 computing device 115 acquires a plurality of images from a sensor 116 included in a vehicle 110. Process 700 could be implemented to operate systems including robots and vehicles 110 including arial, underwater and surface drones based on image data acquired from sensors 116 including image and video sensors, lidar sensors, radar sensors, and ultrasound sensors.

At block 704 process 700 tracks real world locations of an object 410 based on object data included in a reflective surface 412 and determines a trajectory 502 for the object 410 as discussed in relation to FIGS. 3-6, above.

At block 706 process 700 determines a probability of contact between vehicle 110 and object 410 based on predicted trajectory 404 for vehicle 110 and trajectory 502 for the object 410 as discussed in relation to FIGS. 5 and 6, above.

At block 708 process 700 operates the vehicle 110 based on the probability of contact between vehicle 110 and object 410. Operating the vehicle 110 can include computing device 115 transmitting commands to controllers 112, 113, 114 to control one or more of vehicle 110 powertrain, steering, and brakes to alter vehicle trajectory 404. Altering vehicle trajectory 404 can include stopping vehicle 110, slowing vehicle 110 or changing direction of vehicle 110 to cause vehicle 110 to avoid contact or near contact with object 410. Following block 708 process 700 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
a computer that includes a processor and a memory, the memory including instructions executable by the processor to:
acquire a plurality of images from a sensor;
detect a reflective surface included in the images by determining a location of the reflective surface in pixel coordinates wherein a plurality of locations of the reflective surface is detected and the geometric class, the extrinsic properties, and the intrinsic properties of the reflective surface are determined by inputting the plurality of images into a neural network;
determine a plurality of real world object locations of an object included in the reflective surface based on attributes of the reflective surface including a geometric class, extrinsic properties that relate the reflective surface to an environment, intrinsic properties describing the reflective surface without referring to the environment and calibration properties of the sensor; and determine a probability of contact based on a closest approach between the object and the sensor when the object and the sensor are predicted to pass without contact.

2. The system of claim 1, the instructions including further instructions to determine an object trajectory based on tracking the plurality of real world locations of the object.

3. The system of claim 2, the instructions including further instructions to determine the probability of contact between the object and the sensor based on the plurality of real world locations, the object trajectory, a location of the sensor and a trajectory for the sensor.

4. The system of claim 3, wherein the probability of contact between the sensor and the object is determined by the trajectory for the sensor based on real world location, speed, and direction of the sensor, and determining the trajectory for the object based on real world location, speed, and direction of the object.

5. The system of claim 3, wherein the sensor is included in a vehicle and the probability of contact between the object and the sensor includes a probability of contact between the object and the vehicle.

6. The system of claim 5, the instructions including further instructions to operate the vehicle based on the probability of contact between the object and the vehicle.

7. The system of claim 1, wherein the geometric class includes one or more of planar, convex, concave, and irregular, the extrinsic properties include location, size and orientation of the reflective surface, and the intrinsic properties include an optical distortion model.

8. The system of claim 1, wherein the calibration properties of the sensor include a sensor location, a sensor orientation, a sensor focal distance, and a sensor scale.

9. The system of claim 1, wherein the reflective surface is one or more of a mirror, a surface of a puddle, a window, and a metallic surface.

10. The system of claim 1, wherein real world locations of the reflective surface are determined based on output from the neural network and the calibration properties of the sensor.

11. The system of claim 10, wherein the real world locations of the reflective surface are tracked by inputting the real world locations of the reflective surface into a Kalman filter.

12. The system of claim 1, the instructions including further instructions to determine a region of interest included in the reflective surface included in the plurality images that include the object.

13. A method, comprising:
acquiring a plurality of images from a sensor;
detecting a reflective surface included in the images by determining a location of the reflective surface in pixel coordinates wherein a plurality of locations of the reflective surface is detected and the geometric class, the extrinsic properties, and the intrinsic properties of the reflective surface are determined by inputting the plurality of images into a neural network;
determining a plurality of real world locations of an object included in the reflective surface based on attributes of the reflective surface including a geometric class, extrinsic properties that relate the reflective surface to an environment, intrinsic properties describing the reflective surface without referring to the environment; and calibration properties of the sensor; and
determining a probability of contact based on a closest approach between the object and the sensor when the object and the sensor are predicted to pass without contact.

14. The method of claim 13, further comprising determining an object trajectory based on the plurality of real world locations of the object.

15. The method of claim 14, further comprising determining the probability of contact between the object and the sensor based on the plurality of real world locations of an object, the object trajectory, a location of the sensor and a predicted trajectory for the sensor.

16. The method of claim 15, wherein the probability of contact between the sensor and the object is determined by the trajectory for the sensor based on real world location, speed, and direction of the sensor, and determining the trajectory for the object based on real world location, speed, and direction of the object.

17. The method of claim 15, wherein the sensor is included in a vehicle and the probability of contact between the object and the sensor includes a probability of contact between the object and the vehicle.

18. The method of claim 13, wherein the geometric class includes one or more of planar, convex, concave, and irregular, the extrinsic properties include location, size and orientation of the reflective surface, and the intrinsic properties include an optical distortion model.

19. The method of claim 13, wherein the calibration properties of the sensor include a sensor location, a sensor orientation, a sensor focal distance, and a sensor scale.

20. The method of claim 13, wherein the reflective surface is one or more of a mirror, a surface of a puddle, a window, and a metallic surface.

* * * * *